(12) United States Patent
Hsiao et al.

(10) Patent No.: US 8,547,489 B2
(45) Date of Patent: Oct. 1, 2013

(54) 3D DISPLAY PANEL AND METHOD FOR MANUFACTURING THE SAME

(75) Inventors: Chia-Chiang Hsiao, Shenzhen (CN); Chih-Wen Chen, Shenzhen (CN); Chengming He, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 51 days.

(21) Appl. No.: 13/375,257

(22) PCT Filed: Oct. 19, 2011

(86) PCT No.: PCT/CN2011/080988
§ 371 (c)(1),
(2), (4) Date: Nov. 30, 2011

(87) PCT Pub. No.: WO2013/040822
PCT Pub. Date: Mar. 28, 2013

(65) Prior Publication Data
US 2013/0070185 A1    Mar. 21, 2013

(30) Foreign Application Priority Data
Sep. 21, 2011   (CN) .......................... 2011 1 0281391

(51) Int. Cl.
    *G02F 1/1335*    (2006.01)
(52) U.S. Cl.
    USPC ............... 349/15; 349/96; 349/119; 349/137; 349/187; 359/465
(58) Field of Classification Search
    USPC ............. 349/15, 96, 117, 119, 123, 137, 187; 359/462, 465, 489.07; 348/58; 430/321; 445/24, 25
    See application file for complete search history.

(56) References Cited

U.S. PATENT DOCUMENTS

| 6,046,849 | A  | * | 4/2000  | Moseley et al. ............... 359/465 |
| 6,961,177 | B2 |   | 11/2005 | Sato |
| 2009/0141201 | A1 | * | 6/2009  | Yeh et al. .......................... 349/15 |
| 2010/0060721 | A1 | * | 3/2010  | Chen et al. ..................... 348/51 |
| 2010/0238546 | A1 |   | 9/2010  | Hsu et al. |
| 2013/0063685 | A1 | * | 3/2013  | Hsiao et al. ..................... 349/96 |

FOREIGN PATENT DOCUMENTS

| CN | 101183177 | 5/2008 |
| CN | 101799599 | 8/2010 |
| CN | 101819328 | 9/2010 |
| CN | 101872073 | 10/2010 |
| CN | 102141703 | 8/2011 |

* cited by examiner

Primary Examiner — Dung Nguyen
Assistant Examiner — Tai Duong

(57) ABSTRACT

The present invention provides a 3D display panel and a method for manufacturing the same. The method comprises the following steps: forming a liquid crystal layer between a first substrate and a second substrate; arranging a first polarizer at an outer side of the first substrate; arranging a second polarizer at an outer side of the second substrate; forming an alignment layer on a transparent substrate; forming a half wave layer on the alignment layer; arranging the half wave layer, the alignment layer and the transparent substrate at an outer side of the first polarizer in sequence; and forming a quarter wave layer at an outer side of the transparent substrate. The present invention can enhance the yield and display quality of the 3D display.

10 Claims, 4 Drawing Sheets

3D DISPLAY PANEL AND METHOD FOR MANUFACTURING THE SAME

FIELD OF THE INVENTION

The present invention relates to a display panel and a method for manufacturing the same, and more particularly to a three-dimensional (3D) display panel for displaying 3D images and a method for manufacturing the same.

BACKGROUND OF THE INVENTION

Liquid crystal displays (LCDs) have been widely applied in electrical products. Currently, most of LCDs are backlight type LCDs which include a liquid crystal panel and a backlight module.

At present, the LCDs are capable of having a 3D image displaying function, such as a 3D pattern retarder display which has a half (½) wave plate and a quarter (¼) wave plate being disposed at an outer side of an LCD panel.

In general, the pattern retarder display has left image pixels and right image pixels. The left image pixels are positioned at odd pixel rows (or even pixel rows) of the display, and the right image pixels are positioned at the other pixel rows thereof. When the light of the display passes through the half-wave phase retarders and the quarter-wave phase retarders with different orientations, the light is transformed into a left handed circularly polarized light and a right handed circularly polarized light, respectively. A user can use circular polarizer glasses with different polarized directions such that the user's left eye only sees images of the left image pixels, and the user's right eye only sees images of the right image pixels. Therefore, the 3D image effect of the display is achieved.

However, in the above-mentioned 3D display, the half wave plate is first disposed on the quarter wave plate, and then the half wave plate is aligned. At this time, the alignment of the half wave plate tends to be insufficient or to fail, hence deteriorating a manufacturing process yield of the 3D display.

SUMMARY OF THE INVENTION

The present invention provides a 3D display panel and a method for manufacturing the same, so as to enhance the yield and display quality of the 3D display.

A primary object of the present invention is to provide a 3D display panel, and the 3D display panel comprises: a first substrate; a second substrate; a liquid crystal layer formed between the first substrate and the second substrate; a first polarizer disposed at an outer side of the first substrate; a second polarizer disposed at an outer side of the second substrate; a half wave layer disposed at an outer side of the first polarizer; an alignment layer disposed at an outer side of the half wave layer; a transparent substrate disposed at an outer side of the alignment layer; and a quarter wave layer disposed at an outer side of the transparent substrate.

In one embodiment of the present invention, the cover substrate is a cover lens which is made of a material of high strength.

In one embodiment of the present invention, the 3D display panel further comprises an anti-glare film and/or an anti-reflection film disposed at an outer side of the quarter wave layer.

Another object of the present invention is to provide a method for manufacturing a 3D display panel, and the method comprises the following steps: forming a liquid crystal layer between a first substrate and a second substrate; arranging a first polarizer at an outer side of the first substrate; arranging a second polarizer at an outer side of the second substrate; forming an alignment layer on a transparent substrate; forming a half wave layer on the alignment layer; arranging the half wave layer, the alignment layer and the transparent substrate at an outer side of the first polarizer in sequence; and forming a quarter wave layer at an outer side of the transparent substrate.

In one embodiment of the present invention, the step of forming the half wave layer comprises: coating a half wave liquid crystal layer on the alignment layer; and patterning the half wave liquid crystal layer to form the half wave layer having a plurality of half wave rows and a plurality of isotropic material rows.

In one embodiment of the present invention, the step of patterning the half wave liquid crystal layer comprises: using a mask to expose the half wave liquid crystal layer to light, so as to allow portions of the half wave liquid crystal layer being emitted by the light to form the half wave rows, and to allow other portions of the half wave liquid crystal layer which are not emitted by the light to form the isotropic material rows.

In one embodiment of the present invention, the step of forming the quarter wave layer comprises: bonding a quarter wave retarder film to the outer side of the transparent substrate, so as to form the quarter wave layer.

In one embodiment of the present invention, the step of bonding the quarter wave retarder film comprises: bonding an anti-glare film and/or an anti-reflection film to one side surface of the quarter wave retarder film; and bonding another side surface of the quarter wave retarder film to the outer side of the transparent substrate.

In one embodiment of the present invention, the step of forming the quarter wave layer comprises: performing a surface treatment on an outer surface of the quarter wave layer.

Still another object of the present invention is to provide a method for manufacturing a 3D display panel, and the method comprises the following steps: forming a liquid crystal layer between a first substrate and a second substrate; arranging a first polarizer at an outer side of the first substrate; arranging a second polarizer at an outer side of the second substrate; forming an alignment layer on a transparent substrate; coating a half wave liquid crystal layer on the alignment layer; patterning the half wave liquid crystal layer to form a half wave layer having a plurality of half wave rows and a plurality of isotropic material rows; arranging the half wave layer, the alignment layer and the transparent substrate at an outer side of the first polarizer in sequence; bonding an anti-glare film and/or an anti-reflection film to one side surface of a quarter wave retarder film; and bonding another side surface of the quarter wave retarder film to an outer side of the transparent substrate.

The method of the present invention for manufacturing the 3D display panel can enhance the yield and quality of the quarter wave layer, thereby enhancing the yield and display quality of the 3D display.

The structure and the technical means adopted by the present invention to achieve the above-mentioned and other objects can be best understood by referring to the following detailed description of the preferred embodiments and the accompanying drawings.

DETAILED DESCRIPTION OF THE PREFERRED EMBODIMENTS

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

Figure 1:
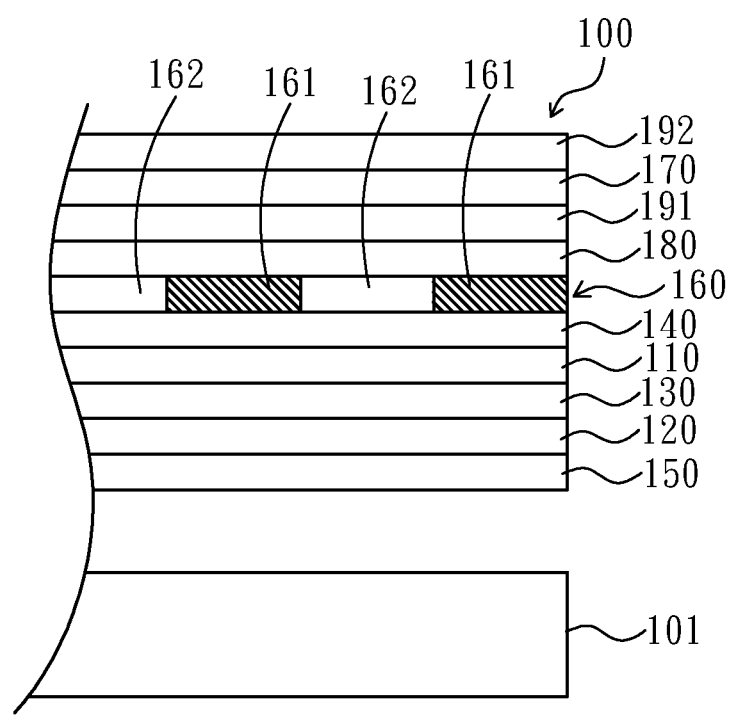
FIG. 1 is a partially cross-sectional view showing a display apparatus according to a preferred embodiment of the present invention.
Figure 2:
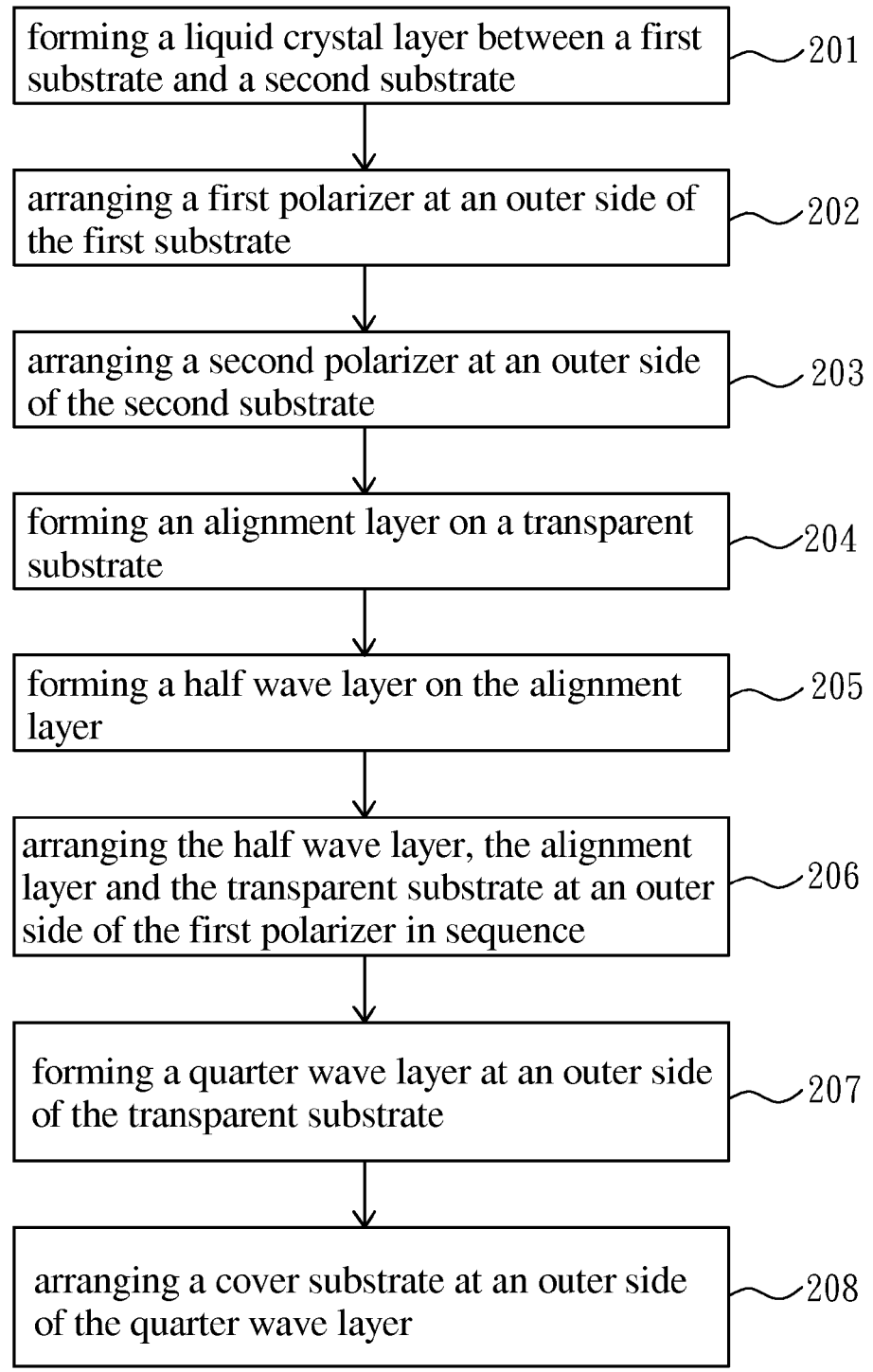
FIG. 2 is a flowchart of a method for manufacturing the 3D display panel according to the preferred embodiment of the present invention.
Figure 3A:
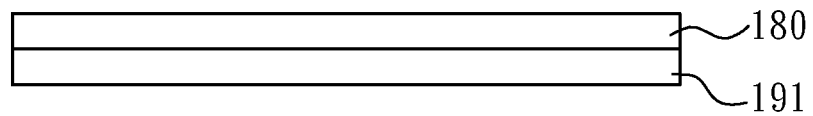
FIGS. 3A-3F are schematic flow diagrams showing a process for manufacturing the 3D display panel according to the preferred embodiment of the present invention.
Figure 3B:
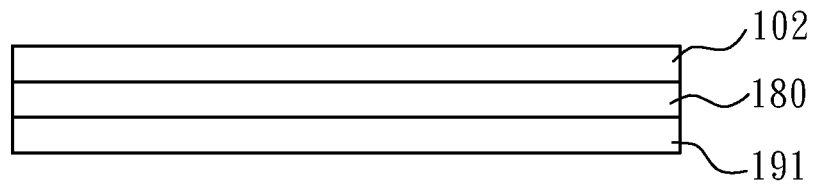
Figure 3C:
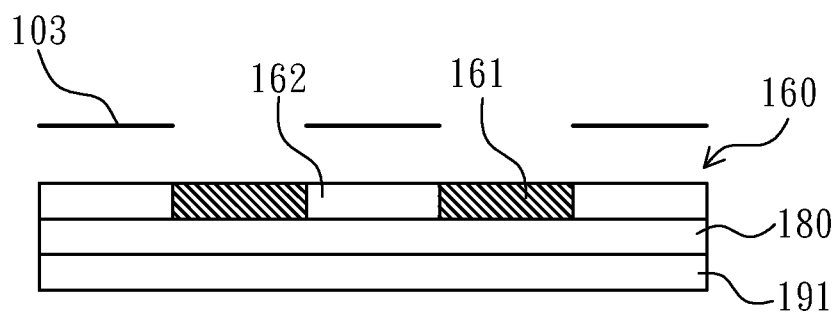
Figure 3D:
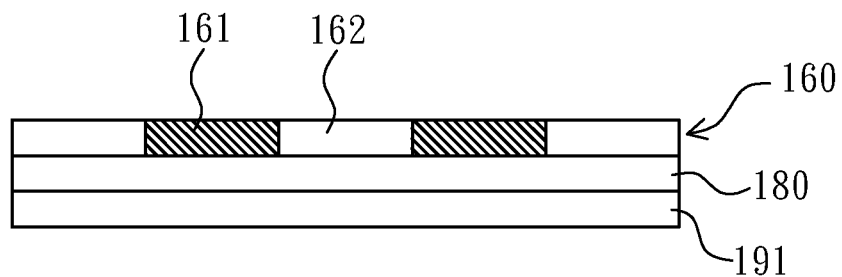
Figure 3E:
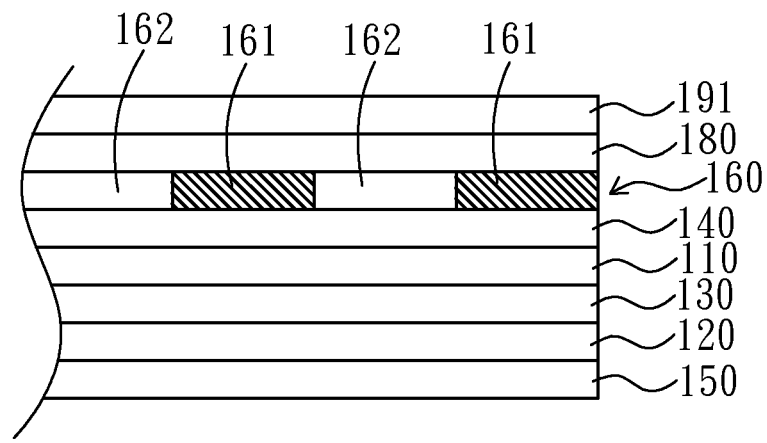
Figure 3F:
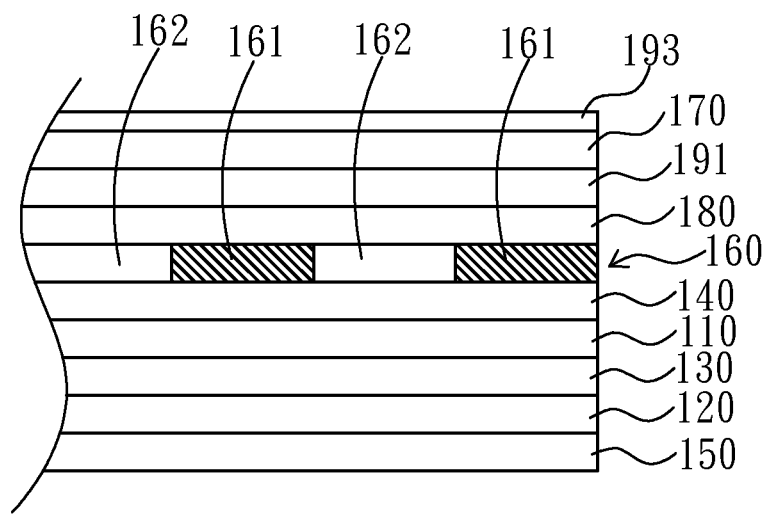

Referring to FIG. 1, a partially cross-sectional view showing a display apparatus according to an embodiment of the present invention is illustrated. The 3D display panel of the present embodiment is capable of displaying 3D images. The 3D display panel 100 can be assembled with a backlight module 101, thereby forming a display apparatus. The display panel 100 is disposed opposite to the backlight module 101, and the backlight module 101 may be realized as an edge lighting backlight module or a bottom lighting backlight module to provide the liquid crystal display panel 100 with the back-light.

Referring to FIG. 1 again, the display panel 100 of the present embodiment comprises a first substrate 110, a second substrate 120, a liquid crystal layer 130, a first polarizer 140, a second polarizer 150, a half (½) wave layer 160, a quarter (¼) wave layer 170, a alignment layer 180, a transparent substrate 191 and a cover substrate 192. The first substrate 110 and the second substrate 120 may be realized as glass substrates or flexible plastic substrates. In this embodiment, the first substrate 110 may be a glass substrate or other material substrates with color filters (CF), and the second substrate 120 may be a glass substrate or other material substrates with a thin film transistor (TFT) array. It should be noted that the CF and the TFT array may also be disposed on the same substrate in other embodiments.

Referring to FIG. 1 again, the liquid crystal layer 130 is formed between the first substrate 110 and the second substrate 120. The first polarizer 140 is disposed on an outer side of the first substrate 110, and the second polarizer 150 is disposed on an outer side of the second substrate 120. The half wave layer 160 is disposed at an outer side of the first polarizer 140. The alignment layer 180 is disposed at an outer side of the half wave layer 160. The transparent substrate 191 is disposed at an outer side of the alignment layer 180. The quarter wave layer 170 is disposed at an outer side of the transparent substrate 191. The cover substrate 192 is disposed at an outer side of the quarter wave layer 170. The transparent substrate 191 is, for example, a glass substrate. The cover substrate 192 is, for example, a cover lens which is preferably made of a material of high strength, such as glass, carbon fiber, reinforced plastics or any combination thereof, for protecting and packaging the structure of the display panel 100.

Referring to FIG. 1 again, the half wave layer 160 includes a plurality of half wave rows 161 and a plurality of isotropic material rows 162. The half wave rows 161 are alternately arranged with the isotropic material rows 162, and a predetermined interval (e.g. a width of the isotropic material row 162) is between each two of the adjacent half wave rows 161.

The half wave rows 161 have a characteristic of a normal half wave phase retarder for transforming a linearly polarized light into a circularly polarized light.

Referring to FIG. 2 and FIG. 3A through FIG. 3F, FIG. 2 is a flowchart of a method for manufacturing the 3D display panel according to an embodiment of the present invention, and FIGS. 3A-3F are schematic flow diagrams showing a process for manufacturing the 3D display panel according to an embodiment of the present invention. The method of the present invention for manufacturing the 3D display panel 100 comprises the following steps: forming the liquid crystal layer 130 between the first substrate 110 and the second substrate 120 (step 201); arranging the first polarizer 140 at the outer side of the first substrate 110 (step 202); arranging the second polarizer 150 at the outer side of the second substrate 120 (step 203); forming the alignment layer 180 on the transparent substrate 191 (step 204); coating the half wave layer 160 on the alignment layer 180 (step 205); arranging the half wave layer 160, the alignment layer 180 and the transparent substrate 191 at the outer side of the first polarizer 140 in sequence (step 206); forming the quarter wave layer 170 at the outer side of the transparent substrate 191 (step 207); and arranging the cover substrate 192 at the outer side of the quarter wave layer 170 (step 208).

In the step 204 of the present embodiment, when forming the alignment layer 180 on the transparent substrate 191, the transparent substrate 191 is provided, and a surface of the transparent substrate 191 is cleaned. Subsequently, referring to FIG. 3A again, for example, a polyimide (PI) layer is coated on the surface of the transparent substrate 191, and then the PI layer is aligned to form the alignment layer 180. In this case, the PI layer may be aligned by rubbing alignment, photo-alignment, ion beam alignment, plasma beam alignment.

In the step 205 of the present embodiment, when forming the half wave layer 160 on the alignment layer 180, referring to FIG. 3B again, a half wave ($\lambda/2$) liquid crystal layer 102 is coated on the alignment layer 180, and then the $\lambda/2$ liquid crystal layer 102 is patterned to form the half wave layer 160 having the half wave rows 161 and the isotropic material rows 162. When patterning the $\lambda/2$ liquid crystal layer 102, referring to FIG. 3C again, a mask is used to expose the $\lambda/2$ liquid crystal layer 102 to light, so as to allow portions of the $\lambda/2$ liquid crystal layer 102 being emitted by the light to form the half wave rows 161, and other portions of the $\lambda/2$ liquid crystal layer 102 which are not emitted by the light are transformed to form the isotropic material rows 162. Subsequently, referring to FIG. 3D again, the patterned half wave layer 160 is baked for curing.

Before the step 206 of the present embodiment, the alignment layer 180 and the half wave layer 160 are first disposed on the transparent substrate 191 in sequence. Subsequently, referring to FIG. 3E again, In the step 206 of the present embodiment, the half wave layer 160, the alignment layer 180 and the transparent substrate 191 are assembled at the outer side of the first polarizer 140.

In the step 207 of the present embodiment, referring to FIG. 3F again, when forming the quarter wave layer 170 at the outer side of the transparent substrate 191, . . . For example, an anti-glare film and/or an anti-reflection film 193 can be first bonded to one side surface of the quarter wave retarder film, and then another side surface of the quarter wave retarder film is bonded to the outer side of the transparent substrate 191. . . . thereby enhancing a manufacturing yield of the quarter wave layer 170. In this embodiment, when forming the quarter wave layer 170, a surface treatment, such as anti-glare (AG) and/or anti-reflection (AR) surface treatment, can be performed on the outer side of the quarter wave layer 170 simultaneously for reducing additional process steps. For example, an anti-glare film and/or an anti-reflection film (not shown) can be first bonded to one side surface of the quarter wave retarder film, and then another side surface of the quarter wave retarder film is bonded to the outer side of the transparent substrate 191. In another embodiment, the surface treatment for AG and/or AR (such as the anti-glare film and/or the anti-reflection film) can be performed on an outer surface of the cover substrate 192.

When a user views the 3D images of the 3D display panel 100 of the present embodiment, polarizer glasses can be used to cooperate with the 3D display panel 100 for forming a 3D image effect. At this time, a linearly polarized light emitted from the first polarizer 140 can be transformed into a left handed circularly polarized light or a right handed circularly polarized light by the quarter wave layer 170 and the half wave layer 160. Since the left handed circularly polarized light or the right handed circularly polarized light emitted from the 3D display panel 100 is only allowed to pass through one side (a right side or a left side) of the polarizer glasses. In other words, the user's eyes can view images of different pixel rows of the 3D display panel 100, respectively, thereby forming the 3D image effect.

As described above, in the 3D display panel of the present invention and the method for manufacturing the same, the quarter wave layer can be formed on a flat surface of a substrate for preventing the quarter wave layer from being aligned on an aligned surface, hence enhancing the yield and quality of the phase retarder film, and further enhancing the yield and display quality of the 3D display.

The present invention has been described above with a preferred embodiment thereof, and it is understood that many changes and modifications to the described embodiment can be carried out without departing from the scope and the spirit of the invention that is intended to be limited only by the appended claims.

The invention claimed is:

1. A 3D display panel, comprising:
   a first substrate;
   a second substrate;
   a liquid crystal layer formed between the first substrate and the second substrate;
   a first polarizer disposed at an outer side of the first substrate;
   a second polarizer disposed at an outer side of the second substrate;
   a half wave layer disposed at an outer side of the first polarizer;
   an alignment layer disposed at an outer side of the half wave layer;
   a transparent substrate disposed at an outer side of the alignment layer; and
   a quarter wave layer disposed at an outer side of the transparent substrate.

2. The 3D display panel according to claim 1, further comprising an anti-glare film and/or an anti-reflection film disposed at an outer side of the quarter wave layer.

3. A method for manufacturing a three-dimensional (3D) display panel, comprising the following steps:
   forming a liquid crystal layer between a first substrate and a second substrate;
   arranging a first polarizer at an outer side of the first substrate;
   arranging a second polarizer at an outer side of the second substrate;
   forming an alignment layer on a transparent substrate;
   coating a half wave liquid crystal layer on the alignment layer;
   patterning the half wave liquid crystal layer to form a half wave layer having a plurality of half wave rows and a plurality of isotropic material rows;
   arranging the half wave layer, the alignment layer and the transparent substrate at an outer side of the first polarizer in sequence;
   bonding an anti-glare film and/or an anti-reflection film to one side surface of a quarter wave retarder film; and
   bonding another side surface of the quarter wave retarder film to an outer side of the transparent substrate.

4. The method according to claim 3, wherein the step of patterning the half wave liquid crystal layer comprises:
   using a mask to expose the half wave liquid crystal layer to light, so as to allow portions of the half wave liquid crystal layer being emitted by the light to form the half wave rows, and to allow other portions of the half wave liquid crystal layer which are not emitted by the light to form the isotropic material rows.

5. A method for manufacturing a 3D display panel, comprising the following steps:
   forming a liquid crystal layer between a first substrate and a second substrate;
   arranging a first polarizer at an outer side of the first substrate;
   arranging a second polarizer at an outer side of the second substrate;
   forming an alignment layer on a transparent substrate;
   forming a half wave layer on the alignment layer;
   arranging the half wave layer, the alignment layer and the transparent substrate at an outer side of the first polarizer in sequence; and
   forming a quarter wave layer at an outer side of the transparent substrate.

6. The method according to claim 5, wherein the step of forming the half wave layer comprises:
   coating a half wave liquid crystal layer on the alignment layer; and
   patterning the half wave liquid crystal layer to form the half wave layer having a plurality of half wave rows and a plurality of isotropic material rows.

7. The method according to claim 6, wherein the step of patterning the half wave liquid crystal layer comprises:
   using a mask to expose the half wave liquid crystal layer to light, so as to allow portions of the half wave liquid crystal layer being emitted by the light to form the half wave rows, and to allow other portions of the half wave liquid crystal layer which are not emitted by the light to form the isotropic material rows.

8. The method according to claim 5, wherein the step of forming the quarter wave layer comprises:
   bonding a quarter wave retarder film to the outer side of the transparent substrate, so as to form the quarter wave layer.

9. The method according to claim 8, wherein the step of bonding the quarter wave retarder film comprises:
   bonding an anti-glare film and/or an anti-reflection film to one side surface of the quarter wave retarder film; and
   bonding another side surface of the quarter wave retarder film to the outer side of the transparent substrate.

10. The method according to claim 5, wherein the step of forming the quarter wave layer comprises:
    performing a surface treatment on an outer surface of the quarter wave layer.

* * * * *